United States Patent
Cheng et al.

(10) Patent No.: US 8,889,215 B2
(45) Date of Patent: *Nov. 18, 2014

(54) METHOD FOR MAKING TOUCH PANEL

(75) Inventors: Jia-Shyong Cheng, New Taipei (TW);
Hung-Yi Hung, New Taipei (TW);
Jeah-Sheng Wu, New Taipei (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 330 days.

This patent is subject to a terminal disclaimer.

(21) Appl. No.: 13/339,688

(22) Filed: Dec. 29, 2011

(65) Prior Publication Data

US 2012/0312772 A1    Dec. 13, 2012

(30) Foreign Application Priority Data

Jun. 9, 2011   (TW) .................................. 100120195

(51) Int. Cl.
*H01B 13/00*  (2006.01)
*G06F 3/044*  (2006.01)

(52) U.S. Cl.
CPC ...... *G06F 3/044* (2013.01); *G06F 2203/04103* (2013.01); *G06F 2203/04112* (2013.01)
USPC ......................................... 427/58; 427/112

(58) Field of Classification Search
CPC .......... C23C 14/00; H01B 13/00; B32B 37/14
USPC ........ 427/372.2, 58, 419.2; 428/1.1; 345/173, 345/174, 175, 176, 177, 178
See application file for complete search history.

(56) References Cited

U.S. PATENT DOCUMENTS

| | | | |
|---|---|---|---|
| 6,842,171 | B2 | 1/2005 | Richter et al. |
| 7,992,292 | B2 * | 8/2011 | Yang ............................... 29/831 |
| 8,199,118 | B2 | 6/2012 | Pennington et al. |
| 2004/0099438 | A1 | 5/2004 | Arthur et al. |
| 2005/0046622 | A1 | 3/2005 | Nakanishi et al. |
| 2005/0126831 | A1 | 6/2005 | Richter et al. |
| 2005/0275415 | A1 | 12/2005 | Sato et al. |
| 2008/0129317 | A1 | 6/2008 | Oba |
| 2009/0159188 | A1 | 6/2009 | Jiang et al. |

(Continued)

FOREIGN PATENT DOCUMENTS

| | | |
|---|---|---|
| CN | 1671481 | 9/2005 |
| CN | 1918538 | 2/2007 |

(Continued)

*Primary Examiner* — Michael Cleveland
*Assistant Examiner* — Tabassom Tadayyon Eslami
(74) *Attorney, Agent, or Firm* — Novak Druce Connolly Bove + Quigg LLP (57) ABSTRACT

The present disclosure relates to a method for making a plurality of touch panels one time. The method includes following steps. A substrate is provided. The substrate has a surface defining a number of target areas with each including two areas: a touch-view area and a trace area. An adhesive layer is formed on the surface of the substrate. A carbon nanotube film is formed on the adhesive layer. The adhesive layer is solidified. An electrode and a conductive trace are formed on each target area so that part of the carbon nanotube film is exposed from a space between adjacent conductive lines of the conductive trace to form an exposed carbon nanotube film on each trace area. The exposed carbon nanotube film on each trace area is removed to obtain a plurality of transparent conductive layers spaced from each other. A number of touch panels is obtained by cutting the substrate.

20 Claims, 9 Drawing Sheets

(56) References Cited

U.S. PATENT DOCUMENTS

| | | |
|---|---|---|
| 2010/0271330 A1 | 10/2010 | Philipp |
| 2011/0018424 A1 | 1/2011 | Takada |
| 2011/0050636 A1 | 3/2011 | Nagata et al. |
| 2011/0095770 A1 | 4/2011 | Kurashima |
| 2011/0157038 A1* | 6/2011 | Feng .................... 345/173 |
| 2012/0211264 A1 | 8/2012 | Milne |
| 2012/0312776 A1* | 12/2012 | Cheng et al. .......... 216/20 |
| 2012/0312777 A1* | 12/2012 | Cheng et al. .......... 216/23 |

FOREIGN PATENT DOCUMENTS

| | | |
|---|---|---|
| CN | 101464763 | 6/2009 |
| CN | 101593066 | 12/2009 |
| JP | 2011-95806 | 5/2011 |
| TW | 200912721 | 3/2009 |
| TW | 201115442 | 5/2011 |

* cited by examiner

METHOD FOR MAKING TOUCH PANEL

CROSS-REFERENCE TO RELATED APPLICATIONS

This application claims all benefits accruing under 35 U.S.C. §119 from Taiwan Patent Application No. 100120195, filed on Jun. 9, 2011, in the Taiwan Intellectual Property Office, the contents of which are hereby incorporated by reference. This application is related to applications entitled, "TOUCH PANEL", filed on Dec. 29, 2011, with application Ser. No. 13/339,643; and "METHOD FOR MAKING TOUCH PANEL", filed on Dec. 29, 2011, with application Ser. No. 13/339,658; and "METHOD FOR MAKING TOUCH PANEL", filed on Dec. 29, 2011, with application Ser. No. 13/339,664; and "PATTERNED CONDUCTIVE ELEMENT", filed on Dec. 29, 2011, with application Ser. No. 13/339,671 now U.S. Pat. No. 8,623,163; and "TOUCH PANEL AND METHOD FOR MAKING THE SAME", filed on Dec. 29, 2011, with application Ser. No. 13/339,678; and "METHOD FOR MAKING TOUCH PANEL", filed on Dec. 29, 2011, with application Ser. No. 13/339,681; and "TOUCH PANEL", filed on Dec. 29, 2011, with application Ser. No. 13/339,696; and "METHOD FOR MAKING PATTERNED CONDUCTIVE ELEMENT", filed on Dec. 29, 2011, with application Ser. No. 13/339,700 now U.S. Pat. No. 8,454,787; and "METHOD FOR MAKING PATTERNED CONDUCTIVE ELEMENT", filed on Dec. 29, 2011, with application Ser. No. 13/339,703 now U.S. Pat. No. 8,623,224; and "TOUCH PANEL", filed on Dec. 29, 2011, with application Ser. No. 13/339,709; and "TOUCH PANEL", filed on Dec. 29, 2011, with application Ser. No. 13/339,718.

BACKGROUND

1. Technical Field

The present disclosure relates to touch panels and method for making the same, particularly, to a carbon nanotube based touch panel and a method for making the same.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation. Due to a higher accuracy and a low-cost of the production, the resistance-type touch panels have been widely used.

A conventional resistance-type or capacitance-type touch panel includes a conductive indium tin oxide (ITO) layer as an optically transparent conductive layer. However, the ITO layer is generally formed by means of ion-beam sputtering and etched by laser beam, and the method is relatively complicated. Furthermore, the ITO layer has poor wearability, low chemical endurance and uneven resistance in an entire area of the panel. Additionally, the ITO layer has a relatively low transparency. All the above-mentioned problems of the ITO layer produce a touch panel with low sensitivity, accuracy, and brightness.

What is needed, therefore, is to provide a touch panel and a method for making the same which can overcome the short come described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present touch panels and method for making the same.

Figure 1:
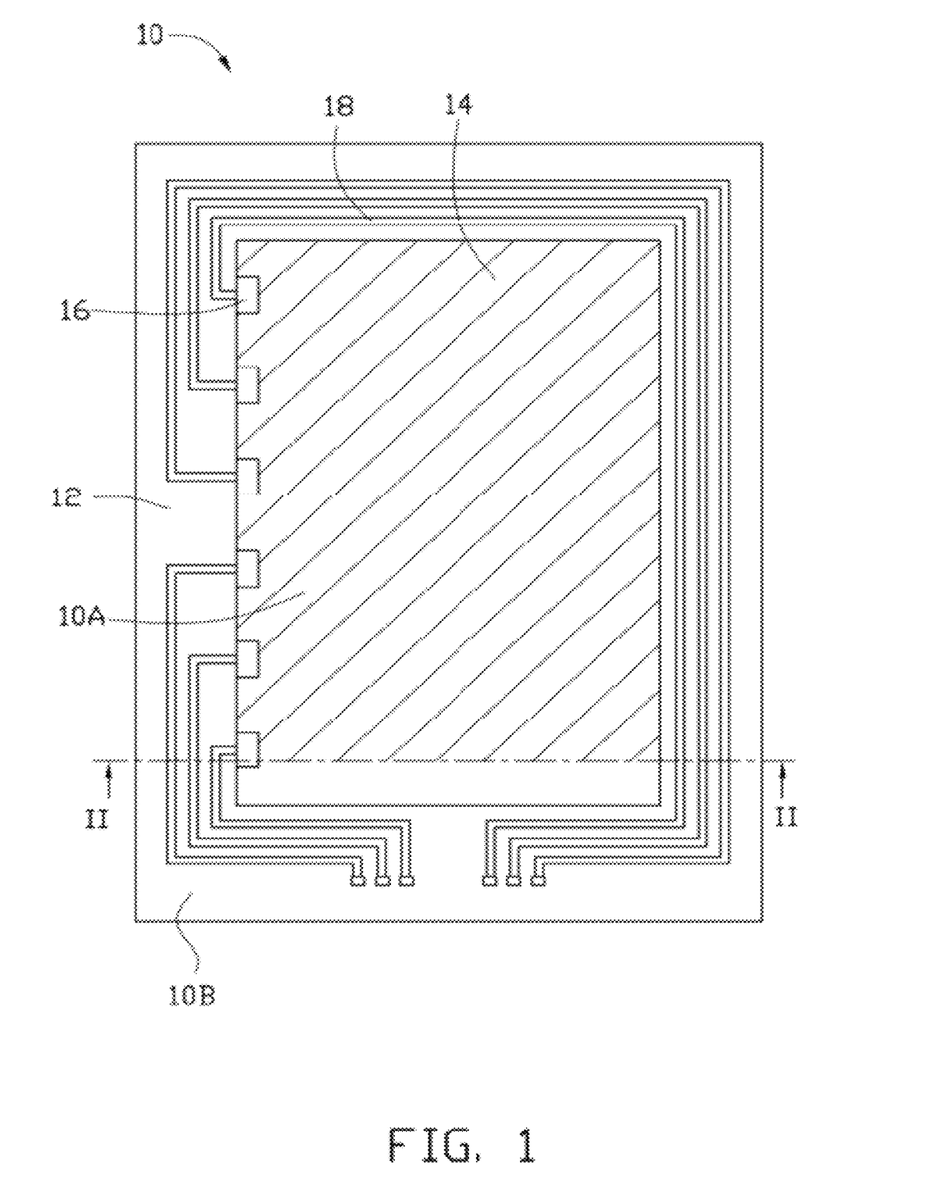
FIG. 1 is a schematic, top view of one embodiment of a touch panel.
Figure 2:
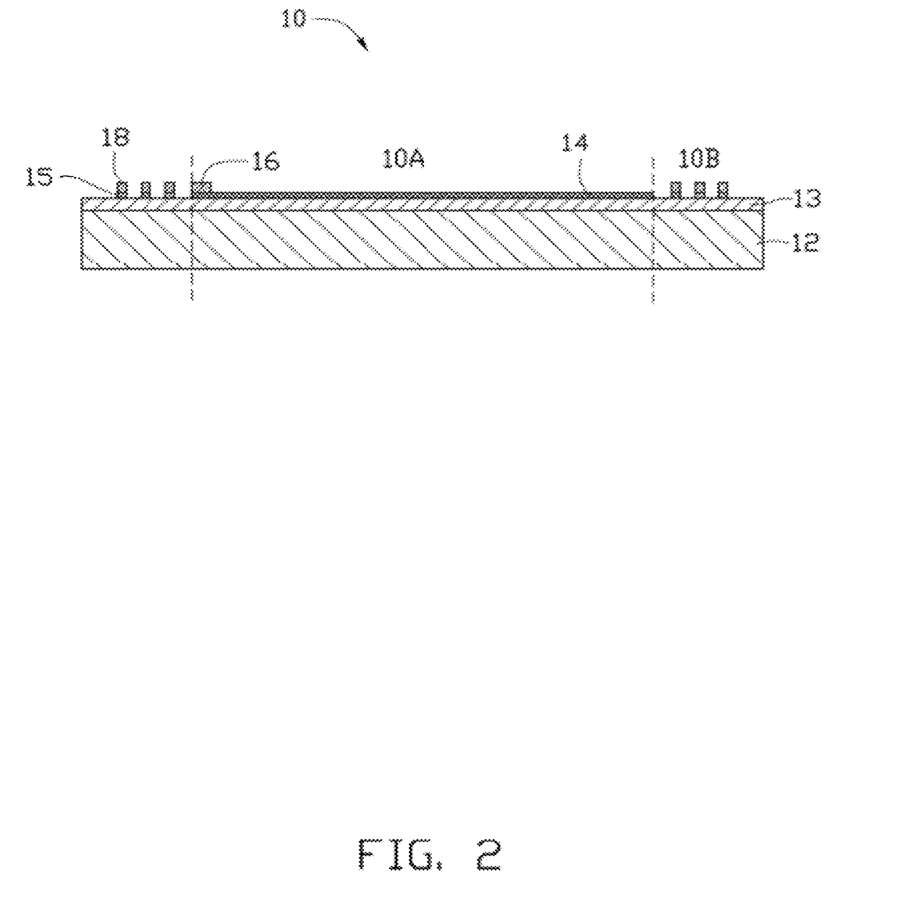
FIG. 2 is a schematic, cross-sectional view, along a line II-II of FIG. 1.

Referring to FIGS. 1 and 2, a touch panel 10 of one embodiment includes a substrate 12, an adhesive layer 13, a transparent conductive layer 14, at least one electrode 16, and a conductive trace 18.

The touch panel 10 defines two areas: a touch-view area 10A and a trace area 10B. The touch-view area 10A is typically a center area of the touch panel 10 which can be touched and viewed to realize the control function. The trace area 10B is usually a periphery area of the touch panel 10 which can be used to support the conductive trace 18. The touch-view area 10A has a relatively large area. The trace area 10B is located on at least one side of the touch-view area 10A. The positional relationship of the touch-view area 10A and the trace area 10B can be selected according to need. In one embodiment, the shape of the touch panel 10 is a rectangle, and the positional relationship of the touch-view area 10A and the trace area 10B is given as below.

For example, the trace area 10B can be an annular region on the periphery, and the touch-view area 10A is a square region on the center and surrounded by the trace area 10B. For example, the trace area 10B can be a strip-shaped region on one side of the touch panel 10, and the touch-view area 10A is rest of the touch panel 10 except the trace area 10B. For example, the trace areas 10B can be two strip-shaped regions on opposite sides of the touch panel 10, and the touch-view area 10A is the region between the trace areas 10B. For example, the trace area 10B can be an L-shaped region on adjacent two sides of the touch panel 10, and the touch-view area 10A is the rest of the touch panel 10 except the trace area 10B. For example, the trace area 10B can be a U-shaped region on three adjacent sides of the touch panel 10, and the touch-view area 10A is the rest of the touch panel 10 except the trace area 10B. In one embodiment, the touch-view area 10A is the center region having a shape the same as that is the shape of touch panel 10 and surrounded by the trace area 10B.

The adhesive layer 13 is located on a surface of the substrate 12. The transparent conductive layer 14 and the conductive trace 18 are located on the adhesive layer 13. The at least one electrode 16 is located on the transparent conductive layer 14. The transparent conductive layer 14 is located only on the touch-view area 10A. The conductive trace 18 is located only on the trace area 10B. Thus, the conductive trace 18 and the transparent conductive layer 14 do not overlap. The at least one electrode 16 is located on at least one side of the transparent conductive layer 14 and electrically connected with the transparent conductive layer 14 and the conductive trace 18. The conductive trace 18 is electrically connected with an external circuit. Because the conductive trace 18 and the transparent conductive layer 14 have no overlapping part, no capacitance signal interference will be produced between the transparent conductive layer 14 and the conductive trace 18 when the touch-view area 10A is touched by a finger or a stylus. Thus, the accuracy of the touch panel 10 is improved.

The substrate 12 can be flat or curved and configured to support other elements. The substrate 12 is insulative and transparent. The substrate 12 can be made of rigid materials such as glass, quartz, diamond, plastic or any other suitable material. The substrate 12 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. In one embodiment, the substrate 12 is a flat and flexible PET plate.

The transparent conductive layer 14 includes a carbon nanotube film. The carbon nanotube film includes a plurality of carbon nanotubes. The carbon nanotube film can be a substantially pure structure of the carbon nanotubes, with few impurities and chemical functional groups. A majority of the carbon nanotubes are arranged to extend along the direction substantially parallel to the surface of the carbon nanotube film. The carbon nanotubes in the carbon nanotube film can be single-walled, double-walled, or multi-walled carbon nanotubes. The length and diameter of the carbon nanotubes can be selected according to need, for example the diameter can be in a range from about 0.5 nanometers to about 50 nanometers and the length can be in a range from about 200 nanometers to about 900 nanometers. The thickness of the carbon nanotube film can be in a range from about 0.5 nanometers to about 100 micrometers, for example in a range from about 100 nanometers to about 200 nanometers. The carbon nanotube film has a good flexibility because of the good flexibility of the carbon nanotubes therein.

The carbon nanotubes of the carbon nanotube film can be arranged orderly to form an ordered carbon nanotube structure or disorderly to form a disordered carbon nanotube structure. The term 'disordered carbon nanotube structure' includes, but is not limited, to a structure where the carbon nanotubes are arranged along many different directions, and the aligning directions of the carbon nanotubes are random. The number of the carbon nanotubes arranged along each different direction can be almost the same (e.g. uniformly disordered). The carbon nanotubes in the disordered carbon nanotube structure can be entangled with each other. The term 'ordered carbon nanotube structure' includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

In one embodiment, the carbon nanotube film is a free-standing structure. The term "free-standing structure" means that the carbon nanotube film can sustain the weight of itself when it is hoisted by a portion thereof without any significant damage to its structural integrity. Thus, the carbon nanotube film can be suspended by two spaced supports. The free-standing carbon nanotube film can be laid on the epitaxial growth surface 101 directly and easily.

Figure 3:
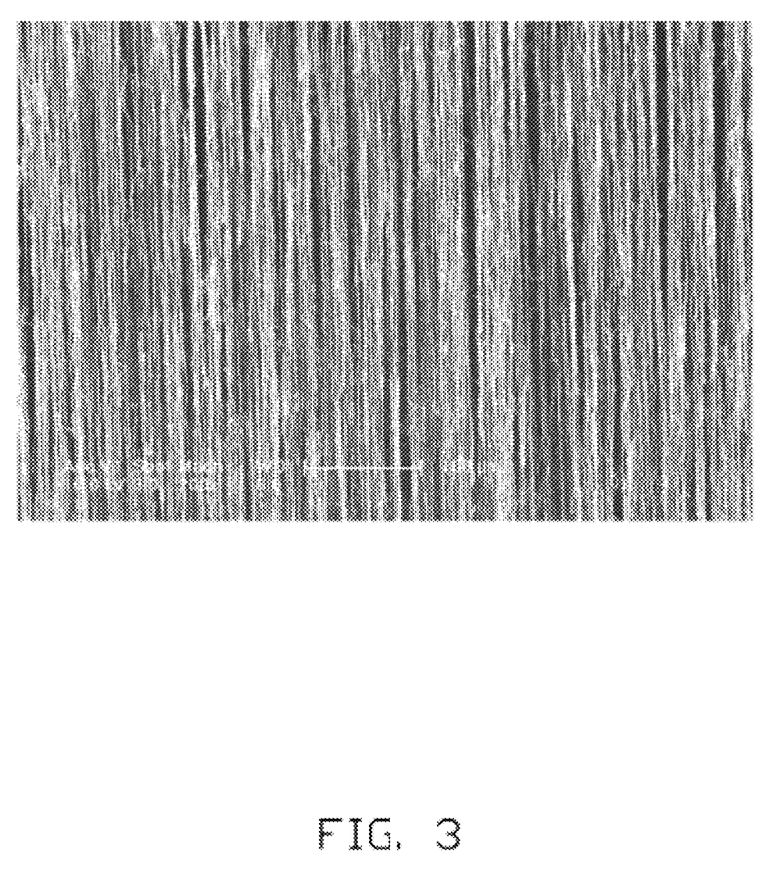
FIG. 3 is a Scanning Electron Microscope (SEM) image of a carbon nanotube film.

In one embodiment, the transparent conductive layer 14 is a single carbon nanotube film. The carbon nanotube film includes a plurality of successive and oriented carbon nanotubes joined end-to-end by van der Waals attractive force therebetween. The carbon nanotube film is a free-standing film. Referring to FIG. 3, each carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. Some variations can occur in the carbon nanotube film. The carbon nanotubes in the carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers.

The transparent conductive layer 14 can include at least two stacked carbon nanotube films. In other embodiments, the transparent conductive layer 14 can include two or more coplanar carbon nanotube films. Additionally, when the carbon nanotubes in the carbon nanotube film are aligned along one preferred orientation, an angle can exist between the orientation of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a plurality of micropores is defined by the carbon nanotube film. Stacking the carbon nanotube films will also add to the structural integrity of the carbon nanotube film.

The carbon nanotube film can be made by the steps of: growing a carbon nanotube array on a wafer by chemical vapor deposition method; and drawing the carbon nanotubes of the carbon nanotube array to from the carbon nanotube film. During the drawing step, the carbon nanotubes are joined end-to-end by van der Waals attractive force therebetween along the drawing direction. The carbon nanotube film has the smallest resistance along the drawing direction and the greatest resistance along a direction perpendicular to the drawing direction. Thus, the carbon nanotube film is resistance anisotropy. Furthermore, the carbon nanotube film can be etched or irradiated by laser. After being irradiated by laser, a plurality of parallel carbon nanotube conductive strings will be formed and the resistance anisotropy of the carbon nanotube film will not be damaged because the carbon nanotube substantially extending not along the drawing direction are removed by burning. Each carbon nanotube conductive string comprises a plurality of carbon nanotubes joined end-to-end by van der Waals attractive force.

The adhesive layer 13 is configured to fix the carbon nanotube film on the substrate 12. Some of the carbon nanotubes of the carbon nanotube film are embedded in the adhesive layer 13 and some of the carbon nanotubes are exposed from the adhesive layer 13. In one embodiment, most of the carbon nanotubes are embedded in the adhesive layer 13. The adhesive layer 13 can be transparent, opaque, or translucent. In one embodiment, the transmittance of the adhesive layer 13 can be greater than 75%. The adhesive layer 13 can be made of materials such as hot plastic or UV (Ultraviolet Rays) glue, for example PVC or PMMA. The thickness of the adhesive layer 13 can be in a range from about 1 nanometer to about 500 micrometers, for example, the thickness is in a range from about 1 micrometer to about 2 micrometers. In one embodiment, the adhesive layer 13 is a UV glue layer with a thickness of 1.5 micrometers.

The at least one electrode 16 is located on at least one side of the transparent conductive layer 14. The position of the electrode 16 depends on the work principle of the touch panel 10 and the detection methods of the touch-point. The number of the electrode 16 depends on the area and resolution of the touch panel 10. In one embodiment, the touch panel 10 includes six electrodes 16 spaced from each other, arranged on one side of the transparent conductive layer 14. The electrodes 16 are located on the surface of the carbon nanotube film and cover part of the carbon nanotube film. The electrodes 16 can permeate into the carbon nanotube film and form a composite with the covered carbon nanotube film. The electrodes 16 can be made of material such as metal, carbon nanotube, conductive silver paste, or ITO. The electrodes 16 can be made by etching a metal film, etching an ITO film, or printing a conductive silver paste.

The conductive trace 18 includes a plurality of conductive lines. The conductive trace 18 can be made of material such as metal, conductive silver paste, or ITO. The conductive trace 18 can be made by etching a metal film, etching an ITO film, or printing a conductive silver paste. In one embodiment, both the conductive trace 18 and the electrodes 16 are made of conductive silver paste and made by printing conductive silver paste concurrently.

Furthermore, the touch panel 10 includes a plurality of carbon nanotube lines 15 located between the conductive trace 18 and the adhesive layer 13. The carbon nanotube lines 15 include a plurality of carbon nanotubes and have the same structure as the carbon nanotube film of the transparent conductive layer 14 described above. The carbon nanotube lines 15 can be the carbon nanotube film having a high ratio of length to diameter. The carbon nanotube lines 15 and the carbon nanotube film of the transparent conductive layer 14 can form a single integrated structure, namely, the carbon nanotube lines 15 extend from the carbon nanotube film of the transparent conductive layer 14. Each carbon nanotube line 15 has a first part of carbon nanotubes embedded in the adhesive layer 13 and a second part of carbon nanotubes embedded in the conductive trace 18 so that the carbon nanotube line 15 forms a composite with the conductive trace 18. Thus, the conductive trace 18 is tightly fixed by the adhesive layer 13. Also, the conductivity of the conductive trace 18 is improved because of the high conductivity of the carbon nanotubes. Because the carbon nanotube lines 15 and the carbon nanotube film of the transparent conductive layer 14 form a single integrated structure, the resistance between the conductive trace 18 and the transparent conductive layer 14 is decreased. The structure and position relationship of the transparent conductive layer 14, the at least one electrode 16, and the conductive trace 18 are further illustrated by following method of making the touch panel 10.

Figure 4:
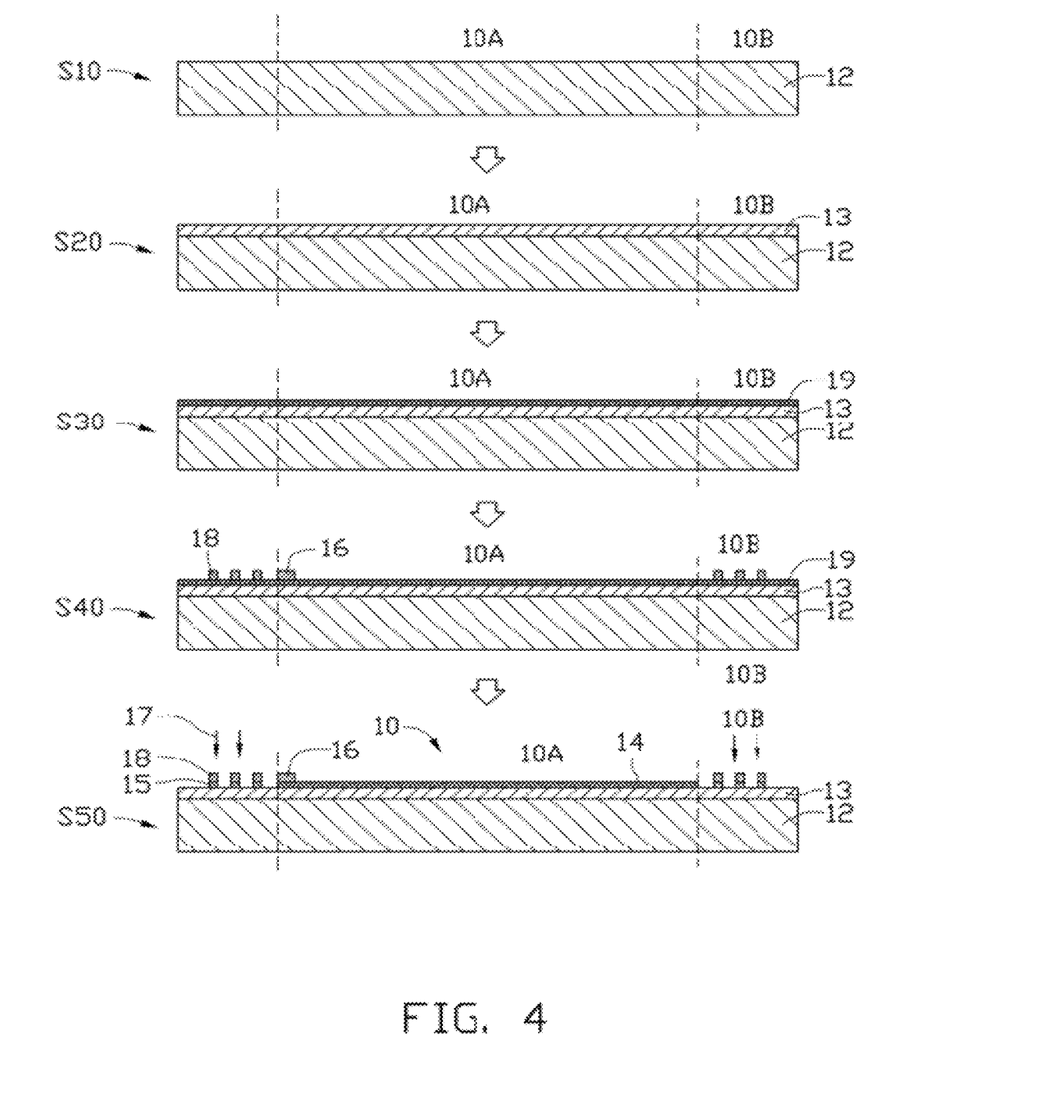
FIG. 4 is a flowchart of one embodiment of a method for making a single touch panel.

Referring to FIG. 4, a method for making the touch panel 10 of one embodiment includes the steps of:

step (S10), providing a substrate 12, wherein the substrate 12 defines two areas: a touch-view area 10A and a trace area 10B;

step (S20), applying an adhesive layer 13 on a surface of the substrate 12;

step (S30), placing a carbon nanotube film 19 on a surface of the adhesive layer 13, and solidifying the adhesive layer 13 to fix the carbon nanotube film 19;

step (S40), forming an electrode 16 and a conductive trace 18 on a surface of the carbon nanotube film 19 so that part of the carbon nanotube film 19 on the trace area 10B is exposed from the conductive trace 18 to form an exposed carbon nanotube film (not labeled) on the trace area 10B; and step (S50), removing the exposed carbon nanotube film on the trace area 10B to obtain a transparent conductive layer 14.

In step (S10), the substrate 12 is a flat and flexible PET plate.

In step (S20), the adhesive layer 13 can be any adhesive which can be solidified on a certain condition. The adhesive layer 13 is transparent and can be made of materials such as hot plastic or UV glue, for example PVC or PMMA. The adhesive layer 13 can be formed by spin-coating, spraying, or brushing. In one embodiment, a UV glue layer with a thickness of 1.5 micrometers is formed on the substrate 12 by spin-coating.

In step (S30), the carbon nanotube film 19 can be formed by transfer printing a preformed carbon nanotube film, filtering and depositing a carbon nanotube suspension, or laying a free-standing carbon nanotube film. In one embodiment, the carbon nanotube film 19 is drawn from a carbon nanotube array and then placed on the adhesive layer 13 directly. The carbon nanotube film 19 can be infiltrated into the adhesive layer 13 after being placed on the adhesive layer 13. In one embodiment, part of the carbon nanotube film 19 is infiltrated into the adhesive layer 13, and part of the carbon nanotube film 19 is exposed through of the adhesive layer 13. Furthermore, a step of pressing the carbon nanotube film 19 can be performed after step (S30) to allow more carbon nanotubes of the carbon nanotube film 19 to infiltrate into the adhesive layer 13.

The method for solidifying the adhesive layer 13 depends on the material of the adhesive layer 13. The thermoplastic adhesive layer 13 can be solidified by cooling, the thermosetting adhesive layer 13 can be solidified by heating, and the UV glue adhesive layer 13 can be solidified by irradiating with ultraviolet light. Because part of the carbon nanotube film 19 is infiltrated into the adhesive layer 13, the carbon nanotube film 19 is fixed by the adhesive layer 13 during solidifying the adhesive layer 13. In one embodiment, the adhesive layer 13 is UV glue layer and solidified by ultraviolet light irradiating for about 2 seconds to about 30 seconds, for example, irradiating for about 4 seconds.

In step (S40), the electrode 16 and the conductive trace 18 can be made by a method such as screen printing, chemical vapor deposition, or magnetron sputtering. The electrode 16 is formed on the touch-view area 10A, and the conductive trace 18 is formed only on the trace area 10B. The electrode 16 and the conductive trace 18 are formed on part of the carbon nanotube film 19 and permeate into the carbon nanotube film 19 to form a composite. Because the carbon nanotube film 19 has a plurality of gaps between the carbon nanotubes, the materials of the electrode 16 and the conductive trace can permeate into the carbon nanotube film 19 easily. In one embodiment, the electrode 16 and the conductive trace 18 are formed concurrently by printing conductive silver paste. The conductive silver paste can include about 50% to about 90% (by weight) of the metal powder, about 2% to about 10% (by weight) of the glass powder, and about 8% to about 40% (by weight) of the binder. The conductive silver paste and the carbon nanotube film 19 can form a composite by mutual infiltration. The carbon nanotube film 19 can be fixed by the conductive silver paste by heating. After forming the conductive trace 18, part of the carbon nanotube film 19 on the trace area 10B is exposed from the space between adjacent conductive lines of the conductive trace 18 to form the exposed carbon nanotube film.

In step (S50), the exposed carbon nanotube film the trace area 10B is removed. The removing step can be performed by a method such as laser-beam etching, ion-beam etching, or electron-beam etching. The conductive trace 18 can be used as a mask for etching the exposed part of the carbon nanotube film 19.

In one embodiment, a laser beam 17 is controlled by a computer (not shown) to etch the exposed carbon nanotube film so that the exposed carbon nanotube film on the trace area 10B is removed. The unexposed part of the carbon nanotube film 19 on the trace area 10B will be maintained between the conductive trace 18 and the adhesive layer 13 to form the plurality of carbon nanotube lines 15. The part of the carbon nanotube film 19 on the touch-view area 10A will be maintained to form the transparent conductive layer 14. The process can simplify the process of making touch panel 10 compared with etching the carbon nanotube film 19 before printing conductive trace 18.

Furthermore, an optically clear adhesive (OCA) layer and a cover lens can be applied on the touch panel 10 to cover the transparent conductive layer 14, the at least one electrode 16, and the conductive trace 18. Thus, a touch screen is obtained.

Figure 5:
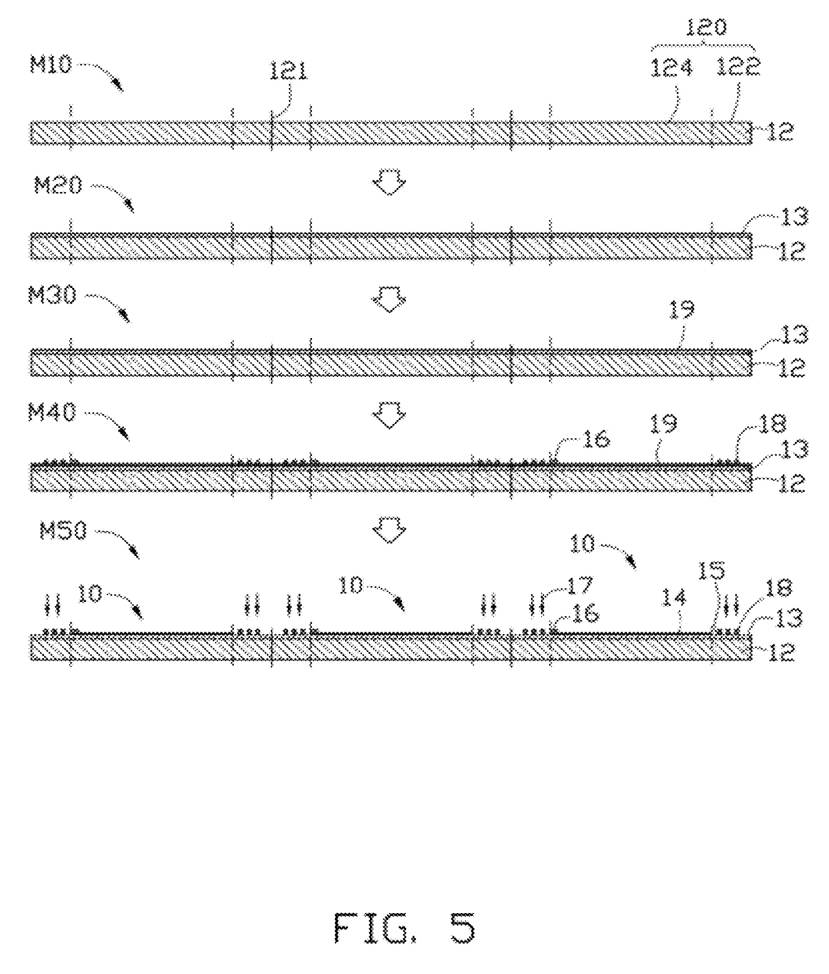
FIG. 5 is a flowchart of one embodiment of a method for making a plurality of touch panels.

Referring to FIGS. 5-9, a method for making a plurality of touch panels 10 of one embodiment includes the steps of:

step (M10), providing a substrate 12 having a surface defining a plurality of target areas 120, each including two areas: a touch-view area 124 and a trace area 122;

step (M20), forming an adhesive layer 13 on the surface of the substrate 12;

step (M30), forming a carbon nanotube film 19 on a surface of the adhesive layer 13, and solidifying the adhesive layer 13 to fix the carbon nanotube film 19;

step (M40), forming an electrode 16 and a conductive trace 18 on a surface of the carbon nanotube film 19 on each target area 120 so that part of the carbon nanotube film 19 on each trace area 122 is exposed from the conductive trace 18 to form an exposed carbon nanotube film on each trace area 122;

step (M50), removing the exposed carbon nanotube film on the trace areas 122 to obtain a plurality of transparent conductive layers 14 spaced from each other; and step (M60), cutting and obtaining a plurality of touch panels 10.

Figure 6:
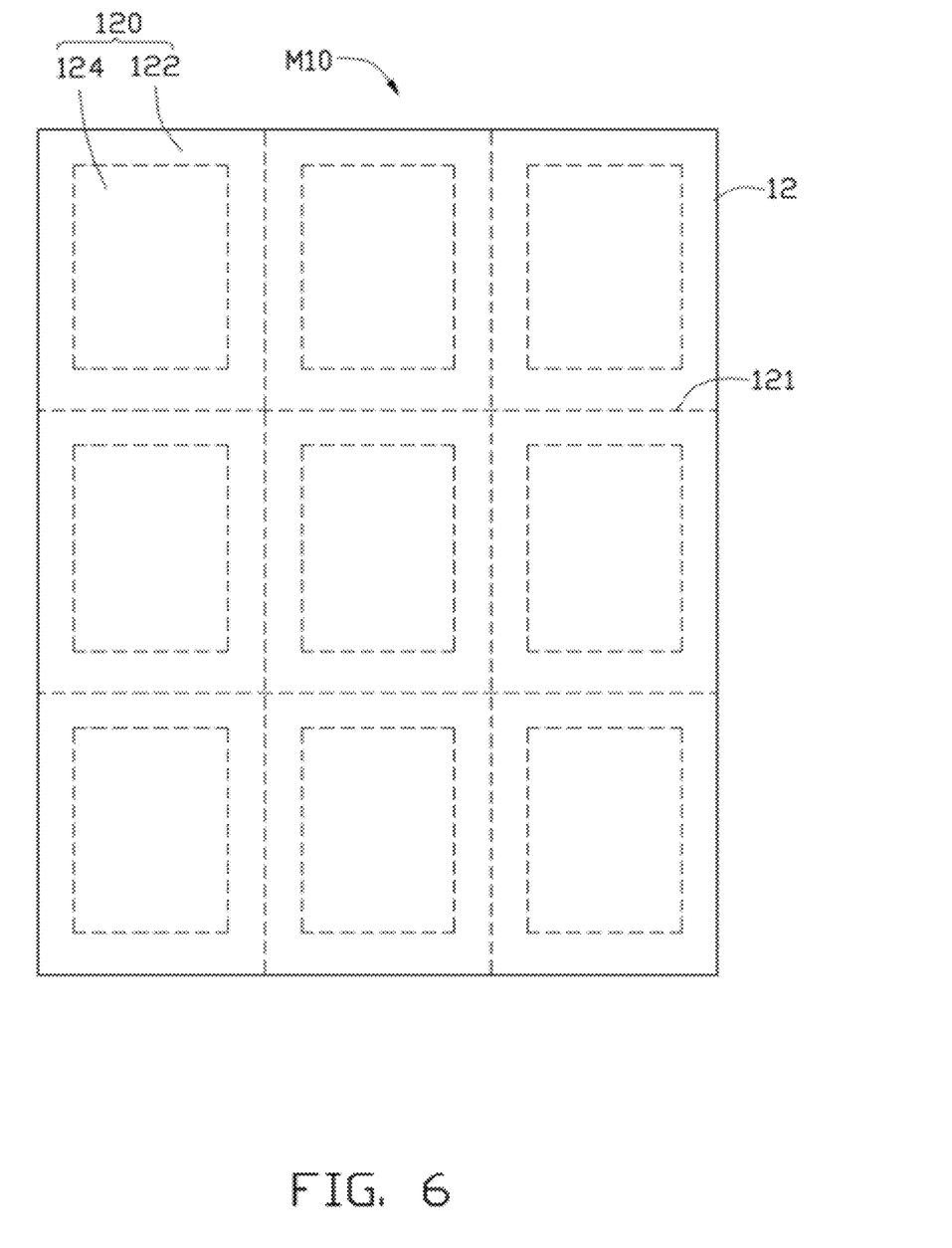
FIG. 6 is a schematic, top view of one embodiment of step (M10) of FIG. 5.

In step (M10), the shape and size of the target areas 120 can be selected according to need. Referring to FIG. 6, in one embodiment, the surface of the substrate 12 is divided into nine target areas 120 arranged in an array of three rows and three columns by four cutting lines 121. The target areas 120 have the same shape and size. The touch-view area 124 is typically a center area of the touch panel 10 which can be touched and viewed to realize the control function. The trace area 122 is usually a periphery area of the touch panel 10 which can be used to support the conductive trace 18. The touch-view area 124 has a relatively large area. The trace area 122 is located on at least one side of the touch-view area 124.

The positional relationship of the touch-view area 124 and the trace area 122 can be selected according to need. In one embodiment, the shape of the touch panel 10 is a rectangle, the touch-view area 124 is the center region having a shape the same as that is the shape of touch panel 10 and surrounded by the trace area 122.

In step (M20), the adhesive layer 13 can be formed by spin-coating, spraying, or brushing. The thickness of the adhesive layer 13 can be in a range from about 1 nanometer to about 500 micrometers. For example, the thickness is in a range from about 1 micrometer to about 2 micrometers. In one embodiment, the substrate 12 is a PET film. The adhesive layer 13 is an UV glue layer with a thickness of 1.5 micrometers and formed on the substrate 12 by spin-coating.

Figure 7:
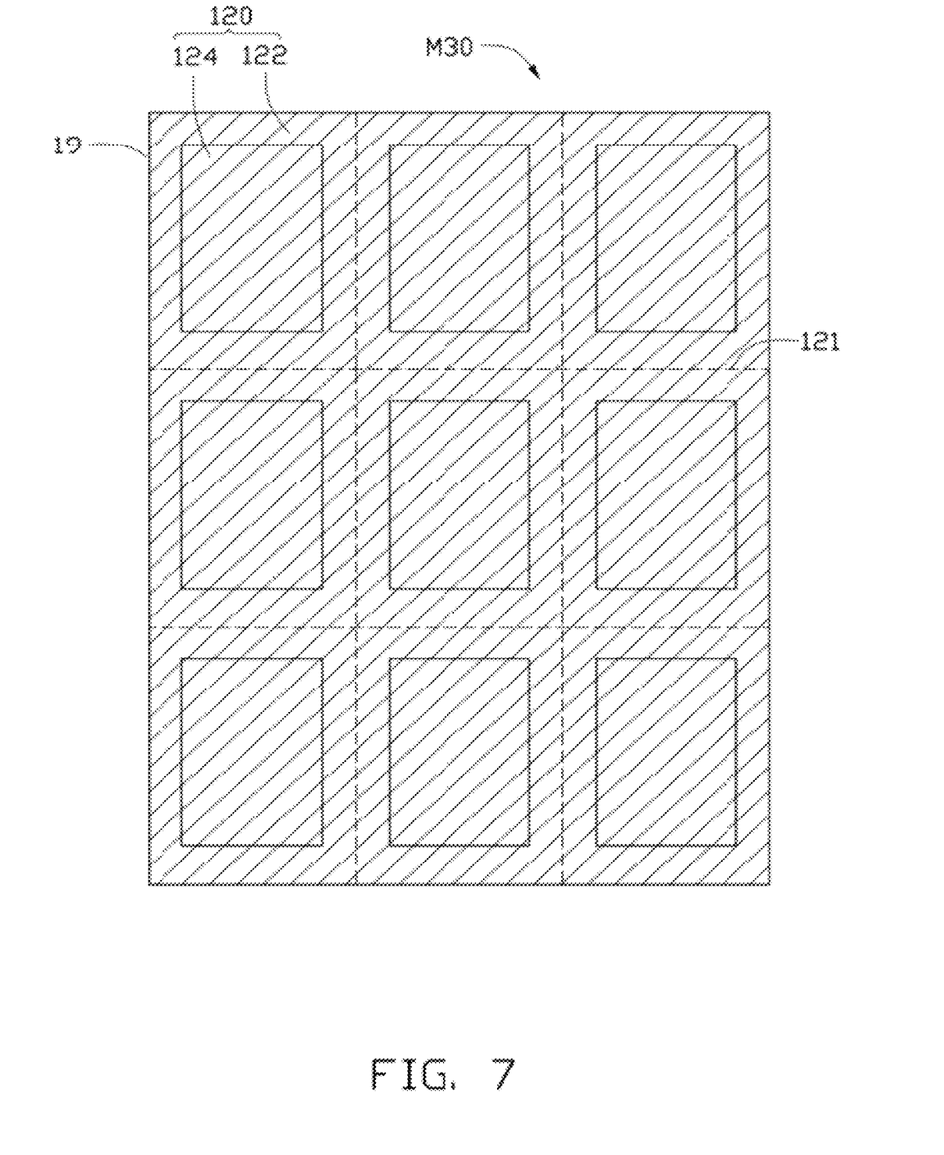
FIG. 7 is a schematic, top view of one embodiment of step (M30) of FIG. 5.

In step (M30), the carbon nanotube film 19 can be formed by transfer printing a preformed carbon nanotube film, filtering and depositing a carbon nanotube suspension, or laying a free-standing carbon nanotube film as shown in FIG. 7. When the width of the free-standing carbon nanotube film is smaller than the width of the adhesive layer 13, a plurality of free-standing carbon nanotube films can be coplanarly placed on the adhesive layer 13 side by side. Each two contacting sides of each two adjacent free-standing carbon nanotube films can overlap the cutting lines 121 between two adjacent target areas 120. The carbon nanotube film 19 can be infiltrated into the adhesive layer 13 after being placed on the adhesive layer 13. In one embodiment, part of the carbon nanotube film 19 is infiltrated into the adhesive layer 13, and part of the carbon nanotube film 19 is exposed through of the adhesive layer 13.

The method for solidifying the adhesive layer 13 depends on the material of the adhesive layer 13. Because part of the carbon nanotube film 19 is infiltrated into the adhesive layer 13, the carbon nanotube film 19 is fixed by the adhesive layer 13 during solidifying the adhesive layer 13. In one embodiment, the adhesive layer 13 is UV glue layer and solidified by ultraviolet light irradiating for about 4 seconds.

Figure 8:
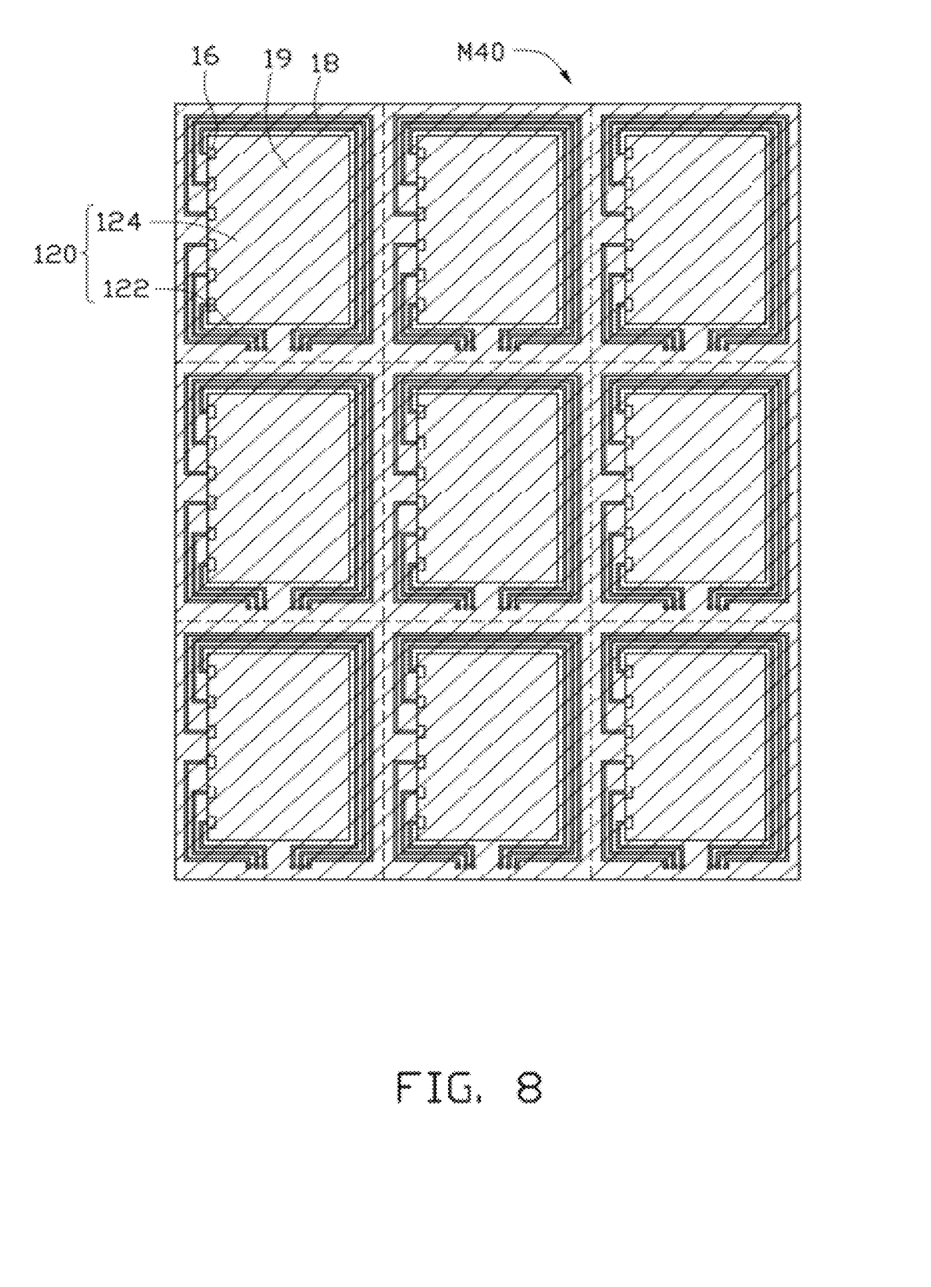
FIG. 8 is a schematic, top view of one embodiment of step (M40) of FIG. 5.

In step (M40), the electrode 16 and the conductive trace 18 can be made of material such as metal, carbon nanotube, conductive silver paste, or ITO and made by etching a metal film, etching an ITO film, or printing a conductive silver paste. Referring to FIG. 8, the electrode 16 is formed on the touch-view area 124 and the conductive trace 18 is formed only on the trace area 122. The electrode 16 and the conductive trace 18 are formed on part of the carbon nanotube film 19 and permeate into the carbon nanotube film 19 to form a composite. Because the carbon nanotube film 19 has a plurality of gaps between the carbon nanotubes, the materials of the electrode 16 and the conductive trace can permeate into the carbon nanotube film 19. In one embodiment, the electrode 16 and the conductive trace 18 are formed concurrently by printing conductive silver paste. The conductive silver paste and the carbon nanotube film 19 can form a composite by mutual infiltration. The carbon nanotube film 19 can be fixed by the conductive silver paste by heating. After forming the conductive trace 18, part of the carbon nanotube film 19 on each trace area 122 is exposed from the space between adjacent conductive lines of the conductive trace 18 to form the exposed carbon nanotube film.

Figure 9:
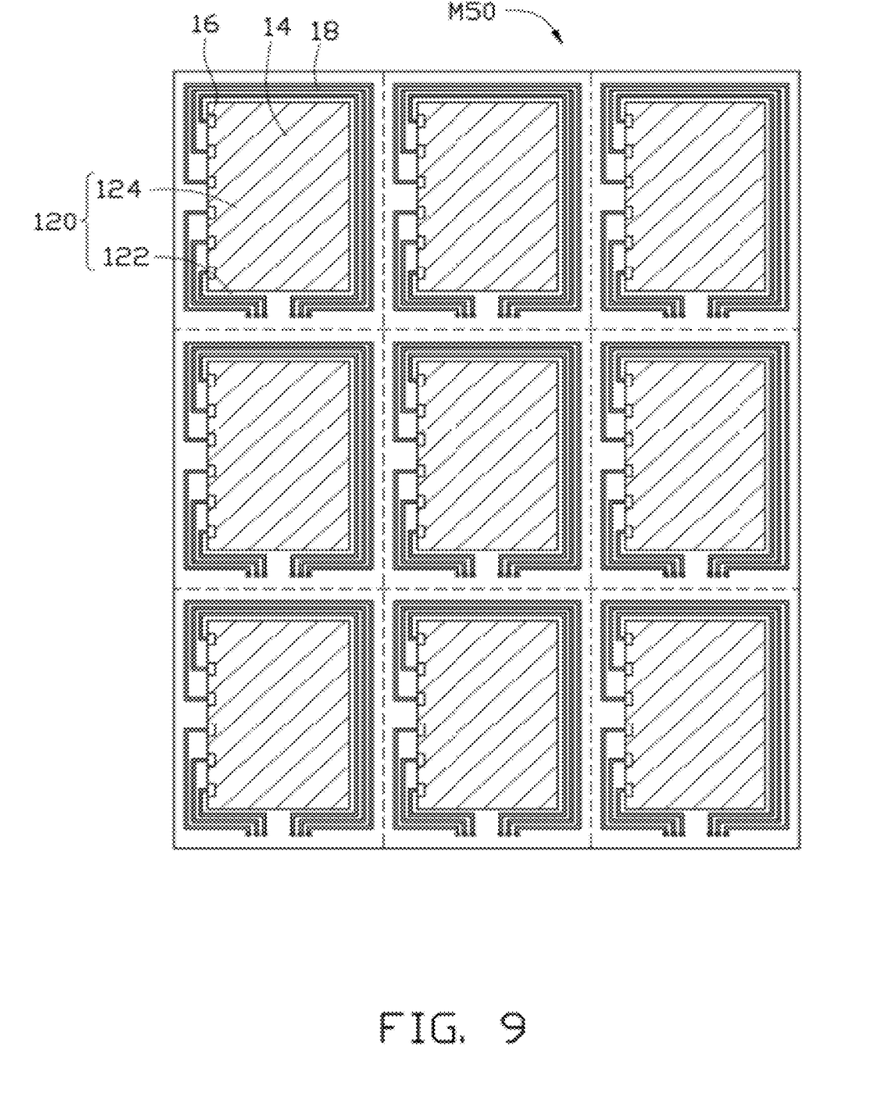
FIG. 9 is a schematic, top view of one embodiment of step (M50) of FIG. 5.

In step (M50), the exposed carbon nanotube film on each trace area 122 is removed. The removing step can be performed by a method such as laser-beam etching, ion-beam etching, or electron-beam etching. The conductive trace 18 can be used as a mask for etching the exposed part of the carbon nanotube film 19. In one embodiment, a laser beam 17 is controlled by a computer (not shown) to etch the exposed carbon nanotube film so that the exposed carbon nanotube film on the trace area 122 is removed. The unexposed part of the carbon nanotube film 19 on the trace area 122 will be maintained between the conductive trace 18 and the adhesive layer 13 to form the plurality of carbon nanotube lines 15. The part of the carbon nanotube film 19 on the touch-view area 124 will be maintained to form the transparent conductive layer 14.

In step (M60), the step of cutting can be performed by a laser beam or a mechanical device such as a blade. In one embodiment, the target areas 120 of the substrate 12 are cut and separated from each other by blade from the cutting lines 121. The blade can move along the row direction firstly and then along the column direction. Thus, the plurality of touch panels 10 is obtained.

Furthermore, an optically clear adhesive (OCA) layer and a cover lens can be applied on the substrate 12 to cover all the transparent conductive layers 14, the electrodes 16, and the conductive traces 18 before step (M60).

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a touch panel, the method comprising:
    providing a substrate having a surface, the surface defining a plurality of target areas, each target area comprising a touch-view area and a trace area;
    applying an adhesive layer on the surface of the substrate;
    placing a carbon nanotube film on a surface of the adhesive layer;
    solidifying the adhesive layer;
    forming an electrode and a conductive trace on a surface of the carbon nanotube film on each target area so that part of the carbon nanotube film is exposed from a space between adjacent conductive lines of the conductive trace to form an exposed carbon nanotube film on each trace area; and
    removing the exposed carbon nanotube film on each trace area to obtain a plurality of transparent conductive layers spaced from each other.

2. The method of claim 1, wherein the adhesive layer is formed by spin-coating, spraying, or brushing.

3. The method of claim 1, wherein the adhesive layer comprises thermoplastic and is solidified by cooling.

4. The method of claim 1, wherein the adhesive layer comprises thermosetting material and is solidified by heating.

5. The method of claim 1, wherein the adhesive layer comprises UV glue and is solidified by ultraviolet light irradiating.

6. The method of claim 1, wherein the carbon nanotube film is formed by filtering and depositing a carbon nanotube suspension.

7. The method of claim 1, wherein the carbon nanotube film is formed by steps of:
    drawing a free-standing carbon nanotube film from a carbon nanotube array; and
    laying the carbon nanotube film on the adhesive layer directly.

8. The method of claim 7, wherein a plurality of carbon nanotube films are coplanarly laid on the adhesive layer side by side, and each two contacting sides of each two adjacent carbon nanotube films are overlapped with a cutting line between two adjacent target areas.

9. The method of claim 1, wherein after applying the carbon nanotube film on the adhesive layer, and the carbon nanotube film comprises carbon nanotubes infiltrated into and extending out of the adhesive layer.

10. The method of claim 1, further comprising pressing the carbon nanotube film after applying the carbon nanotube film on the adhesive layer.

11. The method of claim 1, wherein the electrode and the conductive trace are made by screen printing, chemical vapor deposition, or magnetron sputtering.

12. The method of claim 1, wherein the electrode and the conductive trace are made of metal, conductive silver paste, or ITO.

13. The method of claim 1, wherein the electrode is formed on the touch-view area and the conductive trace is formed only on the trace area.

14. The method of claim 1, wherein the electrode and the conductive trace permeate into the carbon nanotube film to form a composite.

15. The method of claim 1, wherein the electrode and the conductive trace are formed concurrently by printing conductive silver paste.

16. The method of claim 15, wherein the conductive silver paste and the carbon nanotube film form a composite by mutual infiltration.

17. The method of claim 1, wherein the exposed carbon nanotube film on each trace area is removed by laser-beam etching, ion-beam etching, or electron-beam etching.

18. The method of claim 17, wherein the conductive trace is used as a mask for etching the exposed carbon nanotube film on each trace area.

19. The method of claim 1, further comprising a step of cutting the substrate after forming the electrode and the conductive trace on each target area.

20. The method of claim 19, wherein the step of cutting the substrate is performed by a laser beam or a mechanical device.

* * * * *